US012809676B2

(12) United States Patent
Griffin et al.

(10) Patent No.: US 12,809,676 B2
(45) Date of Patent: Nov. 24, 2026

(54) REAL-TIME APPLICATION PRIORITIZATION

(71) Applicant: Red Hat, Inc., Raleigh, NC (US)

(72) Inventors: Leigh Griffin, Waterford (IE); Ellen O'Carroll, Waterford (IE); Anthony Francis Carroll, Waterford (IE)

(73) Assignee: Red Hat, LLC, Raleigh, NC (US)

( * ) Notice: Subject to any disclaimer, the term of this patent is extended or adjusted under 35 U.S.C. 154(b) by 402 days.

(21) Appl. No.: 18/541,840

(22) Filed: Dec. 15, 2023

(65) Prior Publication Data

US 2025/0199856 A1 Jun. 19, 2025

(51) Int. Cl.
*G06F 16/00* (2019.01)
*G06F 9/50* (2006.01)

(52) U.S. Cl.
CPC ...... *G06F 9/5011* (2013.01); *G06F 2209/501* (2013.01); *G06F 2209/5021* (2013.01); *G06F 2209/508* (2013.01)

(58) Field of Classification Search
CPC ............. G06F 9/5011; G06F 2209/501; G06F 2209/5021; G06F 2209/508; G06F 2209/504; G06F 9/5016
See application file for complete search history.

(56) References Cited

U.S. PATENT DOCUMENTS

2004/0267897 A1* 12/2004 Hill ......................... G06F 9/505 709/217
2010/0088707 A1* 4/2010 Corn ..................... G06F 9/5094 718/104
2015/0207661 A1* 7/2015 Kulkarni ............... G06F 9/5016 709/224
2021/0342192 A1* 11/2021 Hamlin ................... G06F 9/485
2021/0373956 A1* 12/2021 Krasner ................ G06F 9/5027
2022/0261287 A1* 8/2022 Dwivedi ............... G06F 9/3836
2023/0114504 A1* 4/2023 He ........................ G06F 9/5027 718/105

(Continued)

FOREIGN PATENT DOCUMENTS

CN 115470134 A * 12/2022 .......... G06F 11/3688
CN 115495251 A * 12/2022 ........... G06F 9/5016
CN 117389711 A * 1/2024 ........... G06F 9/4881

(Continued)

*Primary Examiner* — Alexander Khong
(74) *Attorney, Agent, or Firm* — Dority & Manning, P.A.

(57) ABSTRACT

A current resource utilization value of a computing resource used by an application executing on a computing device is accessed, the current resource utilization value quantifying a utilization of the computing resource, the application having a priority application designation and being one of a plurality of applications executing on the computing device, at least one of the plurality of applications lacking the priority application designation. An application profile that identifies a resource utilization trigger condition that corresponds to the computing resource is accessed. It is determined, based on the current resource utilization value of the computing resource and the resource utilization trigger condition that corresponds to the computing resource, that the application is in a non-preferred state. In response to determining that the application is in the non-preferred state, an additional quantity of the computing resource is caused to be available to the application.

15 Claims, 4 Drawing Sheets

(56) References Cited

U.S. PATENT DOCUMENTS

| | | | | |
|---|---|---|---|---|
| 2023/0259408 A1* | 8/2023 | Grushka | G06F 9/505 718/105 | |
| 2025/0021420 A1* | 1/2025 | Sethi | G06F 11/0781 | |

FOREIGN PATENT DOCUMENTS

| | | | |
|---|---|---|---|
| WO | WO-2019037626 A1 * | 2/2019 | H04L 41/5022 |
| WO | WO-2022095815 A1 * | 5/2022 | G06F 9/5027 |

* cited by examiner

REAL-TIME APPLICATION PRIORITIZATION

BACKGROUND

In computing environments where certain real-time software applications provide critical functionality, such as a braking software application in a ground vehicle or a terrain avoidance software application in an aircraft, it can be important to ensure that the real-time software application has sufficient computing resources to implement desired functionality.

SUMMARY

The examples disclosed herein implement real-time application prioritization.

In one example a method is provided. The method includes accessing, by a monitor executing on a computing device, a current resource utilization value of a computing resource used by a first application executing on the computing device, the current resource utilization value quantifying a utilization of the computing resource, the first application having a priority application designation and being one of a plurality of applications executing on the computing device, at least one of the plurality of applications lacking the priority application designation. The method further includes accessing, by the monitor, an application profile that identifies a resource utilization trigger condition that corresponds to the computing resource. The method further includes determining, by the monitor, based on the current resource utilization value of the computing resource and the resource utilization trigger condition that corresponds to the computing resource, that the first application is in a non-preferred state. The method further includes, in response to determining that the first application is in the non-preferred state causing, by the monitor, a resource utilization action in the computing device to cause an additional quantity of the computing resource to be available to the first application.

In another example a computing device is provided. The computing device includes a memory and a processor device coupled to the memory to access a current resource utilization value of a computing resource used by an application executing on the computing device, the current resource utilization value quantifying a utilization of the computing resource, the application having a priority application designation and being one of a plurality of applications executing on the computing device, at least one of the plurality of applications lacking the priority application designation. The processor device is further to access an application profile that identifies a resource utilization trigger condition that corresponds to the computing resource. The processor device is further to determine, based on the current resource utilization value of the computing resource and the resource utilization trigger condition that corresponds to the computing resource, that the application is in a non-preferred state. The processor device is further to in response to determining that the application is in the non-preferred state cause a resource utilization action in the computing device to cause an additional quantity of the computing resource to be available to the application.

In another example a non-transitory computer-readable storage medium is provided. The non-transitory computer-readable storage medium includes executable instructions to cause a processor device to access a current resource utilization value of a computing resource used by an application executing on the computing device, the current resource utilization value quantifying a utilization of the computing resource, the application having a priority application designation and being one of a plurality of applications executing on the computing device, at least one of the plurality of applications lacking the priority application designation. The instructions further cause the processor device to access an application profile that identifies a resource utilization trigger condition that corresponds to the computing resource. The instructions further cause the processor device to determine, based on the current resource utilization value of the computing resource and the resource utilization trigger condition that corresponds to the computing resource, that the application is in a non-preferred state. The instructions further cause the processor device to, in response to determining that the application is in the non-preferred state cause a resource utilization action in the computing device to cause an additional quantity of the computing resource to be available to the application.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
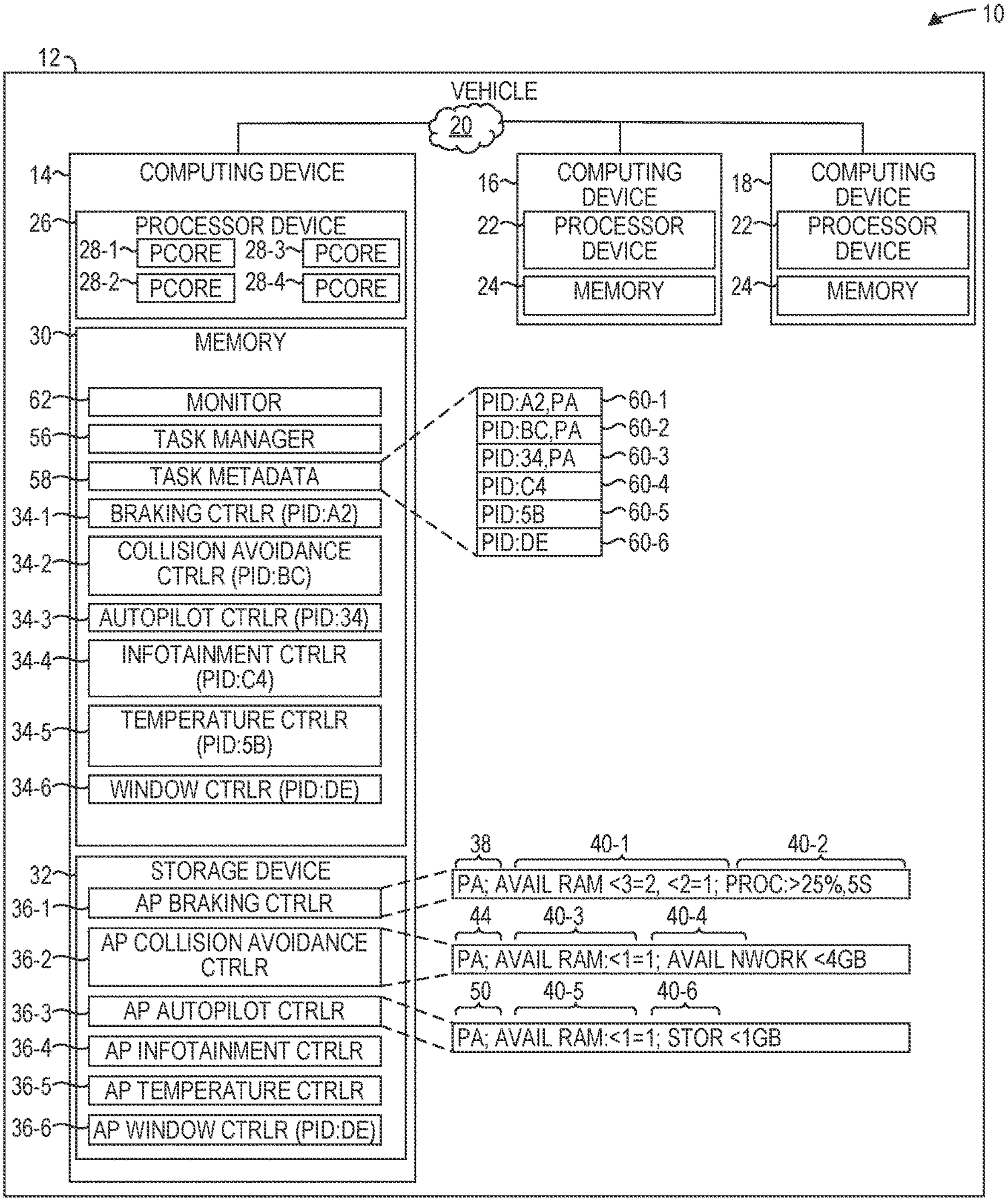
FIG. 1 is a block diagram of an environment suitable for implementing real-time application prioritization according to some implementations.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as “first message” and “second message,” and does not imply an initial occurrence, a quantity, a priority, a type, an importance, or other attribute, unless otherwise stated herein. The term “about” used herein in conjunction with a numeric value means any value that is within a range of ten percent greater than or ten percent less than the numeric value. As used herein and in the claims, the articles “a” and “an” in reference to an element refers to “one or more” of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

In computing environments where certain real-time software applications provide critical functionality, such as a braking software application in a ground vehicle or a terrain avoidance software application in an aircraft, it can be important to ensure that the real-time software application has sufficient computing resources to implement desired functionality.

One such mechanism may be to isolate such software applications in separate dedicated processing devices with independent memory to ensure that such applications have the necessary computing resources needed if it becomes necessary for the software application to implement desired functionality. However, such separate dedicated processing devices raises costs. Another mechanism is to ensure that quantities of computing resources are reserved for the critical software systems, such as a predetermined amount of random access memory (RAM), processor device, storage or the like. However, the software application may in fact never need to utilize the full extent of the reserved computing resource and thus reserving computing resources in this manner can be inefficient. Moreover, even if computing resources are reserved, other software applications may utilize more of a computing resource than expected, resulting in less computing resources actually being available than is desired for a critical real-time application, resulting in an undesired latency of the real-time application at a critical time when the functionality of the real-time application is needed.

The examples disclosed herein implement real-time application prioritization. The examples iteratively monitor the computing resource utilization of computing resources, such as, by way of non-limiting example, a RAM computing resource, a processor device computing resource, a network computing resource, a storage device computing resource, or any other computing resource that is shared among multiple software applications. An application may be designated as a priority application and an application profile identifies resource utilization trigger conditions that, if met, result in a resource utilization action to cause an additional amount of the identified computing resource to be available to the application. In this manner, the computing environment continuously maintains optimal computing resource conditions for such applications, even if doing so is at the expense of applications not designated as a priority application.

The examples disclosed herein improve the computer technology of a computing device by ensuring that sufficient computing resources are available for certain critical applications irrespective of what computing resources a non-critical application may attempt to utilize.

FIG. 1 is a block diagram of an environment 10 suitable for implementing real-time application prioritization according to some implementations. In this example the environment 10 is in the context of a ground vehicle 12, however, the examples disclosed herein are not limited to any particular context and have applicability in any environment wherein a critical real-time application may be needed to, within milliseconds or even microseconds, implement certain functionality and that may execute concurrently with other applications that are less critical, including, by way of non-limiting example, as ground or air based vehicles, boats, utility and manufacturing systems, and the like.

The vehicle 12 includes several computing devices 14, 16 and 18 that are communicatively coupled to one another via a network 20. The computing devices 16 and 18 each include processor devices 22 and memories 24, and are responsible for implementing certain functions of the vehicle 12, such as engine control, problem diagnoses, or the like. The computing device 14 includes a quad-core processor device 26 that comprises processor cores 28-1-28-4 (generally, processor cores 28), each of which may be able to process executable instructions concurrently with other processor cores 28. The computing device 14 includes a memory 30 and includes, or is communicatively coupled to, a storage device 32.

At the instant in time depicted in FIG. 1, the computing device 14 is executing six applications 34-1-34-6 (generally, applications 34). The term "application" as used herein refers to one or more tightly coupled executing processes that implement a desired functionality, and may include a parent process and one or more child processes. The applications 34 may be initiated from executable application packages stored, for example, on the storage device 32 (not illustrated due to spatial limitations). The application 34-1 is a braking controller application (the abbreviation "CTRLR" in FIG. 1 refers to the word "controller") that implements braking functionality such as, by way of non-limiting example, anti-lock braking functionality. The application 34-2 is a collision avoidance controller application that automatically overrides driver input of one or more driver functions, such as steering, braking, accelerating, or the like in response to detecting an imminent collision. The application 34-3 is an autopilot controller application that implements autopilot driving and ensures that the vehicle remains in a driving lane, does not collide with a vehicle in front of the vehicle 12, and maintains a relatively constant set speed, all without driver input. The application 34-4 is an entertainment controller application that provides the driver with streaming music when driving and with games when parked. The application 34-5 is a temperature controller application that implements automatic temperature control in the vehicle 12. The application 34-6 is a window controller that implements window movement in the vehicle 12.

The storage device 32 may maintain application information about one or more of the applications 34. In this example the application information is in the form of one or more application profiles ("AP") 36-1-36-6 (generally, application profiles 36) each of which, in this example, corresponds to one of the applications 34-1-34-6. The application profiles 36 contain metadata about the corresponding applications 34. As an example, the application profile 36-1 corresponds to the application 34-1. The application profile 36-1 contains a priority application designation 38, which, in this example, is indicated by a PA abbreviation. Application profiles 36 for priority applications may include one or more resource utilization trigger conditions that correspond to a particular computing resource, such as, by way of non-limiting example, a RAM computing resource, a processor device computing resource, a network computing resource, or a storage computing resource. A resource utilization trigger condition identifies a non-preferred state for an application 34. The resource utilization trigger conditions may be determined, for example, by executing the corresponding application 34 under a variety of test conditions over a period of time and monitoring computing resource utilization during the execution of the corresponding application 34.

In this example, it has been determined that the application 34-1 may, under certain circumstances, require a peak of 2 gigabytes (GB) of RAM to implement the corresponding functionality. In this example, the application profile 36-1 includes a resource utilization trigger condition 40-1 that identifies a plurality of non-preferred states for the RAM computing resource. A first non-preferred state is if the available RAM is less than 4 GB and a second non-preferred state is if the available RAM is less than 3 GB. The resource utilization trigger condition 40-1 indicates that the initial non-preferred state is a level 2 non-preferred state (e.g., moderate), and that the second non-preferred state is a level 1 non-preferred state (e.g., severe). The monitor 62 may select particular resource utilization actions from a plurality of different resource utilization actions based on the particular non-preferred state. It is noted that the examples disclosed herein utilize a particular syntax to identify resource utilization trigger conditions and levels of non-preferred states, however, any suitable syntax that can communicate the conditions under which a computing resource can cause a non-preferred state for an application 34 can be used. Moreover, while the application profiles 36 are illustrated as separate files, the application profiles can be maintained in any suitable structure or mechanism capable of identifying the resource utilization trigger conditions and levels of non-preferred states, such as, by way of non-limiting example, a rules engine, a database, or the like.

The application profile 36-1 also includes a resource utilization trigger condition 40-2 that identifies a non-preferred state based on the processor device computing resource. In particular, the resource utilization trigger condition 40-2 indicates that, because the application 34-1 may, under certain circumstances, utilize 75% of a processor core over a five second period, if a processor core to which the application 34-1 is assigned has greater than 25% utilization over a five second period, this is a non-preferred state for the application 34-1.

The application profile 36-2 corresponds to the application 34-2. The application profile 36-2 contains a priority application designation 44. The application profile 36-2 includes a resource utilization trigger condition 40-3 that identifies a non-preferred state based on the processor device computing resource. The resource utilization trigger condition 40-3 indicates that available RAM being less than 1 GB is a non-preferred state for the application 34-2. The application profile 36-2 includes a resource utilization trigger condition 40-4 that identifies a non-preferred state based on the network bandwidth utilization computing resource. The resource utilization trigger condition 40-4 indicates that less than 1 GB of available network bandwidth is a non-preferred state for the application 34-2.

The application profile 36-3 corresponds to the application 34-3. The application profile 36-3 contains a priority application designation 50. The application profile 36-3 includes a resource utilization trigger condition 40-5 that identifies a non-preferred state based on the processor device computing resource. The resource utilization trigger condition 40-5 indicates that available RAM being less than 5 GB is a non-preferred state for the application 34-3. The application profile 36-3 includes a resource utilization trigger condition 40-6 that identifies a non-preferred state based on the storage utilization computing resource. The resource utilization trigger condition 40-6 indicates that less than 1 GB of available storage is a non-preferred state for the application 34-3. The resource utilization trigger conditions 40-1-40-6 may be referred to herein generally as the resource utilization trigger conditions 40.

The application profiles 36-4-36-6 correspond to the applications 34-4-34-6, respectively, and each of application profiles 36-4-36-6 lack priority application designations. In some implementations, only applications 34 that are priority applications have corresponding application profiles 36. In other implementations applications 34 that lack the priority application designation may have corresponding application profiles 36 that contain information that may be useful to the computing device 14 for executing the corresponding application 34.

Although for purposes of illustration the resource utilization trigger conditions have been expressed in terms of the cumulative utilization of the computing resources by all applications 34, such as the amount of available memory 30, or the amount of available processor utilization, the resource utilization trigger conditions are not limited to being expressed in such terms. A resource utilization trigger condition may also be quantified in terms of a computing resource utilization of a particular application 34, irrespective of the cumulative resource utilization of a computing resource. For example, a resource utilization trigger condition may be based on a current amount of RAM utilization of an application 34 rather than on the current aggregate RAM utilization of memory 30 by all applications 34.

As an application 34 is initiated, a task manager 56 maintains task metadata 58 about the application 34. The task metadata 58 may comprise entries 60-1-60-6 (generally, entries 60), each entry 60 corresponding to and maintaining data about one of the applications 34. The entries 60 may identify a process ID (PID) via which each application 34-1 is identified by the computing device 14 and the priority application designation PA if such application 34 has been designated as a priority application.

The memory 30 includes a monitor 62 that iteratively accesses current (e.g. real-time) resource utilization values of computing resources used by the applications 34-1-34-6. The resource utilization values of computing resources may include, for example, the current memory utilization, the current processor utilization, the current network utilization, and the current storage utilization. The monitor 62 may also access the resource utilization values of computing resources on a per application basis, such as the current memory utilization of an application 34, the current processor utilization of an application 34, the current network utilization of an application 34, and/or the current storage utilization of an application 34.

The monitor 62 may iteratively access current resource utilization values of computing resources, such as every 10 milliseconds (ms), every 100 ms, every 1 second, or at any other suitable or desired interval. The monitor 62 may access the current resource utilization values by, for example, invoking an entry point of one or more operating system processes that, when invoked, return the real-time resource utilization values of computing resources, such as the current amount of available memory 30, the current processor utilization of each of the processor cores 28-1-28-4, the current available storage of the storage device 32, and the current network bandwidth utilization of the network 20. The monitor 62 may access the task metadata 58 to determine that the applications 34-1-34-3 have been designated priority applications. The monitor 62 may utilize the PIDs identified in the entries 60 to obtain, on an application by application basis, the current amount of memory 30 used by an application 34, the current processor utilization of an application 34, the current storage used by an application 34, and the current network bandwidth utilization of an application 34.

The monitor 62 may also access the application profiles 36-1-36-3 and continuously determine, based on the current resource utilization values of computing resources and the resource utilization trigger conditions 40, whether a resource utilization trigger condition 40 has been triggered, and thus if an application 34 is in a non-preferred state.

As an example of real-time application prioritization, the monitor 62 accesses the current resource utilization value of the memory 30. The current resource utilization value of the memory 30 quantifies the current RAM utilization, and indicates that, at that instant, there is 2.5 GB of available memory 30. The monitor 62 accesses the application information in the application profile 36-1 and, based on the resource utilization trigger condition 40-1 and the current resource utilization value of the memory 30, determines that the application 34-1 is in a non-preferred state. In response to determining that the application 34-1 is in the non-preferred state, the monitor 62 causes a resource utilization action in the computing device 14 to cause an additional quantity of the memory 30 to be available to the application 34-1. The particular resource utilization actions that may be taken may be identified in the application profile, may be designed into the monitor 62, may be identified in a rules engine, or may be determined in any other suitable or desirable manner. In this example, the resource utilization trigger condition 40-1 identifies multiple non-preferred resource utilization states, and the monitor 62 determines that the application 34-1 is in a level 2 non-preferred state (e.g., moderate) rather than a level 1 non-preferred state. For a level 2 non-preferred state, the monitor 62 may, for example, determine current resource utilization values of the memory 30 for each of the applications 36-4-36-6 that lack the priority application designation. The monitor 62 may, for example, determine that the application 34-4 is utilizing 4 GB of memory, more than is being used by the applications 36-5-36-6. Because the resource utilization trigger condition 40-1 indicates that available memory less than 3 GB causes the application 34-1 to be in a non-preferred state and that there is currently 2.5 GB of memory 30, the monitor 62 may cause a reduction in the amount of memory allocated to the application 34-4. For example, the monitor 62 may communicate with a task, such as the task manager 56, and instruct the task manager 56 to reduce the amount of memory allocated to the application 34-4 to 3 GB, in order to make 1 GB of the memory 30 available.

Subsequently, such as 50 ms later, the monitor 62 may again access the current resource utilization value of the memory 30. The current resource utilization value of the memory 30 indicates that, at that instant, there is now 3.5 GB of available memory 30, and thus that the application 34-1 is no longer in the non-preferred state.

Subsequently, the monitor 62 may again access the current resource utilization value of the memory 30. The current resource utilization value of the memory 30 indicates that, at that instant, there is now 1.8 GB of available memory 30, and thus that the application 34-1 is in a level 1 (e.g., severe) non-preferred state. For a level 1 non-preferred state, the monitor 62 may again determine current resource utilization values of the memory 30 for each of the applications 36-4-36-6 that lack the priority application designation. The monitor 62 determines that the application 34-4 is using 3 GB of the memory 30, the application 34-5 is using 2 GB of the memory 30, and application 34-6 is using 2.5 GB of the memory 30. The monitor 62 determines that 1.2 GB of memory is needed to bring the application 34-1 into a preferred state. The monitor 62 causes the resource utilization action of terminating the application 34-5. For example, the monitor 62 instructs the task manager 56 to terminate the application 34-5.

In some implementations, applications 34 that are not designated as priority applications may be prioritized in an order via which such applications should be used for resource utilization actions of the monitor 62 such that the monitor 62 causes resource utilization actions to be performed against certain applications 34 before other applications 34.

As another example of real-time application prioritization, the monitor 62 accesses the current resource utilization value of the memory 30 and determines that no resource utilization trigger condition 40 is triggered. The monitor 62 accesses the current resource utilization value of the processor cores 28-1-28-4 and continuously monitors the aggregate processor core utilization of each of the processor cores 28-1-28-4. The monitor 62 determines that the application 34-1 typically is assigned a time slot on the processor core 28-1 along with several of the other applications 34, and that the processor core 28-1 has an aggregate 90% utilization rate over a five second period. The monitor 62 determines that, based on the resource utilization trigger condition 40-2 and the aggregate processor core utilization of the processor core 28-1, the application 34-1 is in the non-preferred state. The monitor 62 performs a resource utilization action to cause an additional quantity of the processor device 26 to be available to the application 34-1. In this example, the monitor 62 instructs the task manager 56 to exclusively allocate the processor core 28-4 to the application 34-1.

As another example of real-time application prioritization, the monitor 62 accesses the current resource utilization value of the memory 30 and determines that no resource utilization trigger condition 40 is triggered. The monitor 62 accesses the current network bandwidth utilization computing resource. The monitor 62 determines that the total network bandwidth of the network 20 is 10 Gbps, and that the network bandwidth utilization of the network 20 is 80%, and thus the amount of available network bandwidth is 2 Gbps. The monitor 62 determines, based on the resource utilization trigger condition 40-4 and the current network bandwidth utilization, that the application 34-2 is in the non-preferred state. The monitor 62 accesses the current network bandwidth utilization of each of the applications 34-4-34-6 that lack the priority application designation. The monitor 62 determines that the application 34-4 utilizes 4 Gbps of network bandwidth. The monitor 62 performs a resource utilization action that causes the application 34-4 to utilize less network bandwidth. In one example, the monitor 62 instructs the task manager to terminate the application 34-4. In another example, the monitor 62 instructs the task manager to set a network utilization parameter of the application 34-4 to limit the application 34-4 to 3 Gbps.

As another example of real-time application prioritization, the monitor 62 accesses the current resource utilization value of the storage computing resource, in this example, the storage device 32, and determines that the amount of available storage is 0.5 GB. The monitor 62 determines, based on the resource utilization trigger condition 40-6, that the application 34-3 is in the non-preferred state because less than 1 GB is available. The monitor 62 performs a resource utilization action that is a storage enlargement action to cause the current available storage to increase. In one example, the monitor 62 initiates a storage garbage collection process that causes more than 0.5 GB of storage to be deleted from the storage device 32. In another example, the monitor 62 accesses the current storage utilization of each of the applications 34-4-34-6 that lack the priority application designation. The monitor 62 determines that the application 34-5 is utilizing 3 GB of temporary storage. The monitor 62 causes the application 34-5 to be terminated to make the 3 GB of storage available.

It is noted that the resource utilization actions described herein are merely examples, and that in practice the monitor 62 may perform any number of different resource utilization actions. As additional examples, the monitor 62 may dynamically adjust scheduling parameters for the processor device 26 and/or particular processor cores 28, may adjust memory allocation policies, may implement storage device I/O prioritization, may implement caching techniques, and/or may alter network Quality-of-Service (QoS) settings to prioritize applications 34 that have been designated as priority applications over applications 34 that lack the priority designation. In other examples, the monitor 62 may assign applications 34 that have the priority application designation to dedicated processor cores 28, may isolate such applications 34 that lack the priority application designation using virtualization technologies such as containers or virtual machines, or may use QoS mechanisms to prioritize traffic from applications 34 that have the priority application designation over applications 34 that lack the priority application designation. Such techniques ensure that applications 34 that have the priority application designation have the necessary computing resources to meet their performance requirements, while still allowing applications 34 that lack the priority application designation to run efficiently.

It is noted that, because the monitor 62 is a component of the computing device 14, functionality implemented by the monitor 62 may be attributed to the computing device 14 generally. Moreover, in examples where the monitor 62 comprises software instructions that program the processor device 26 to carry out functionality discussed herein, functionality implemented by the monitor 62 may be attributed herein to the processor device 26.

Figure 2:
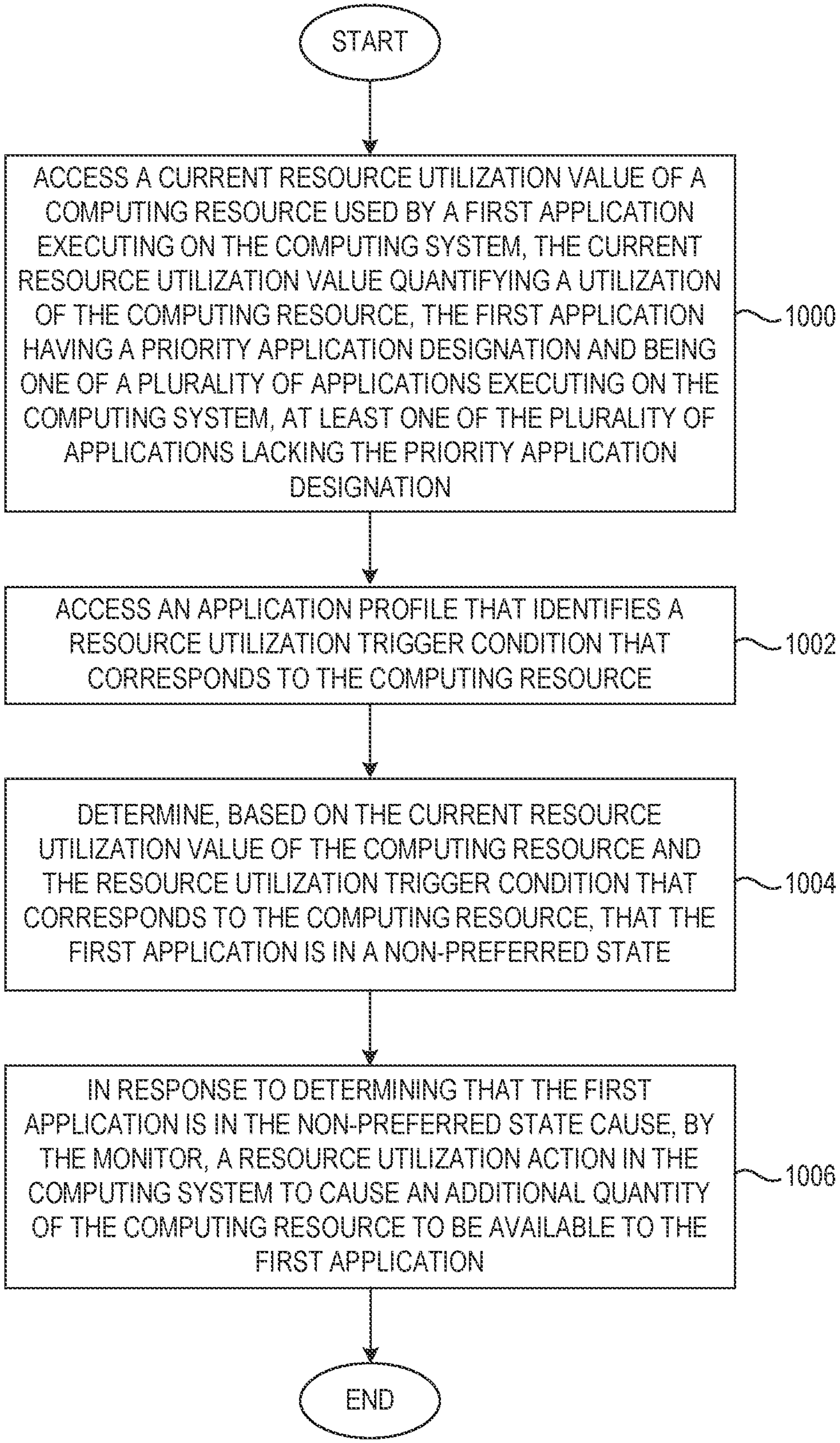
FIG. 2 is a flowchart of a method for implementing real-time application prioritization according to some implementations.

FIG. 2 is a flowchart of a method for implementing real-time application prioritization according to some implementations. FIG. 2 will be discussed in conjunction with FIG. 1. The computing device 14 accesses the current resource utilization value of a computing resource used by the application 34-1 executing on the computing device 14, the current resource utilization value quantifying a utilization of the computing resource, the application 34-1 having the priority application designation and being one of the plurality of applications 34-1-34-6 executing on the computing device 14, at least one of the plurality of applications 34-1-34-6 lacking the priority application designation (FIG. 2, block 1000). The computing device 14 accesses the application profile 36-1 that identifies a resource utilization trigger condition 40-1 that corresponds to the computing resource (FIG. 2, block 1002). The computing device 14 determines, based on the current resource utilization value of the computing resource and the resource utilization trigger condition 40-1 that corresponds to the computing resource, that the application 34-1 is in the non-preferred state (FIG. 2, block 1004). in response to determining that the application 34-1 is in the non-preferred state the computing device 14 causes a resource utilization action in the computing device 14 to cause an additional quantity of the computing resource to be available to the application 34-1 (FIG. 2, block 1006).

Figure 3:
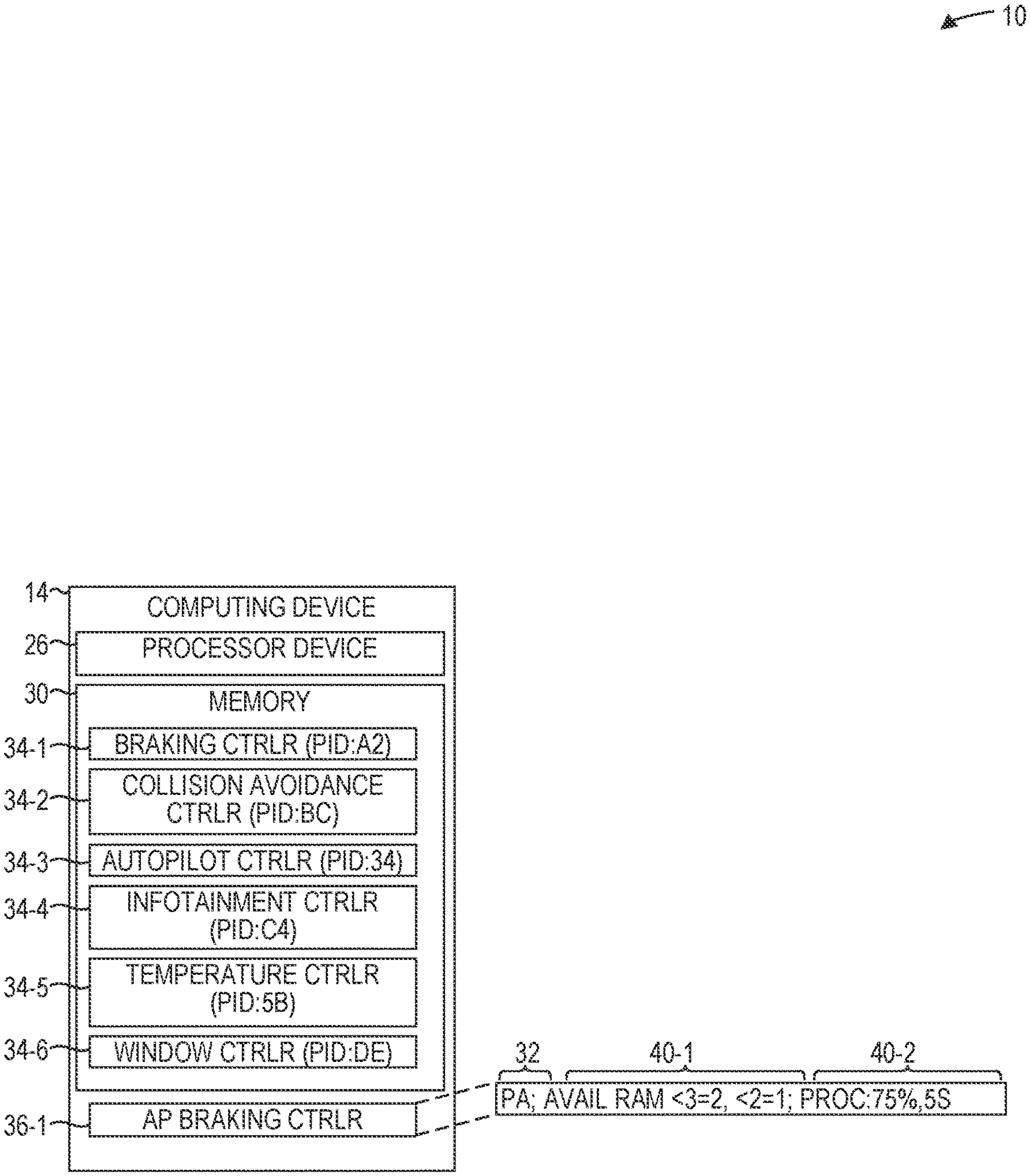
FIG. 3 is a simplified block diagram of the environment illustrated in FIG. 1 according to some implementations.

FIG. 3 is a simplified block diagram of the environment 10 illustrated in FIG. 1 according to some implementations. The environment 10 includes the computing device 14, the memory 30 and the processor device 26 coupled to the memory 30. The processor device 26 is to access a current resource utilization value of a computing resource used by the application 34-1 executing on the computing device 14, the current resource utilization value quantifying a utilization of the computing resource, the application 34-1 having the priority application designation and being one of a plurality of applications 34-1-34-6 executing on the computing device 14, at least one of the plurality of applications 34-1-34-6 lacking the priority application designation. The processor device 26 further to access the application profile 36-1 that identifies the resource utilization trigger condition 40-1 that corresponds to the memory 30 computing resource.

The processor device 26 is further to determine, based on the current resource utilization value of the memory 30 and the resource utilization trigger condition 40-1 that corresponds to the memory 30, that the application 34-1 is in a non-preferred state. The processor device 26 is further to, in response to determining that the application 34-1 is in the non-preferred state, cause a resource utilization action in the computing device 14 to cause an additional quantity of the memory 30 to be available to the application 34-1.

Figure 4:
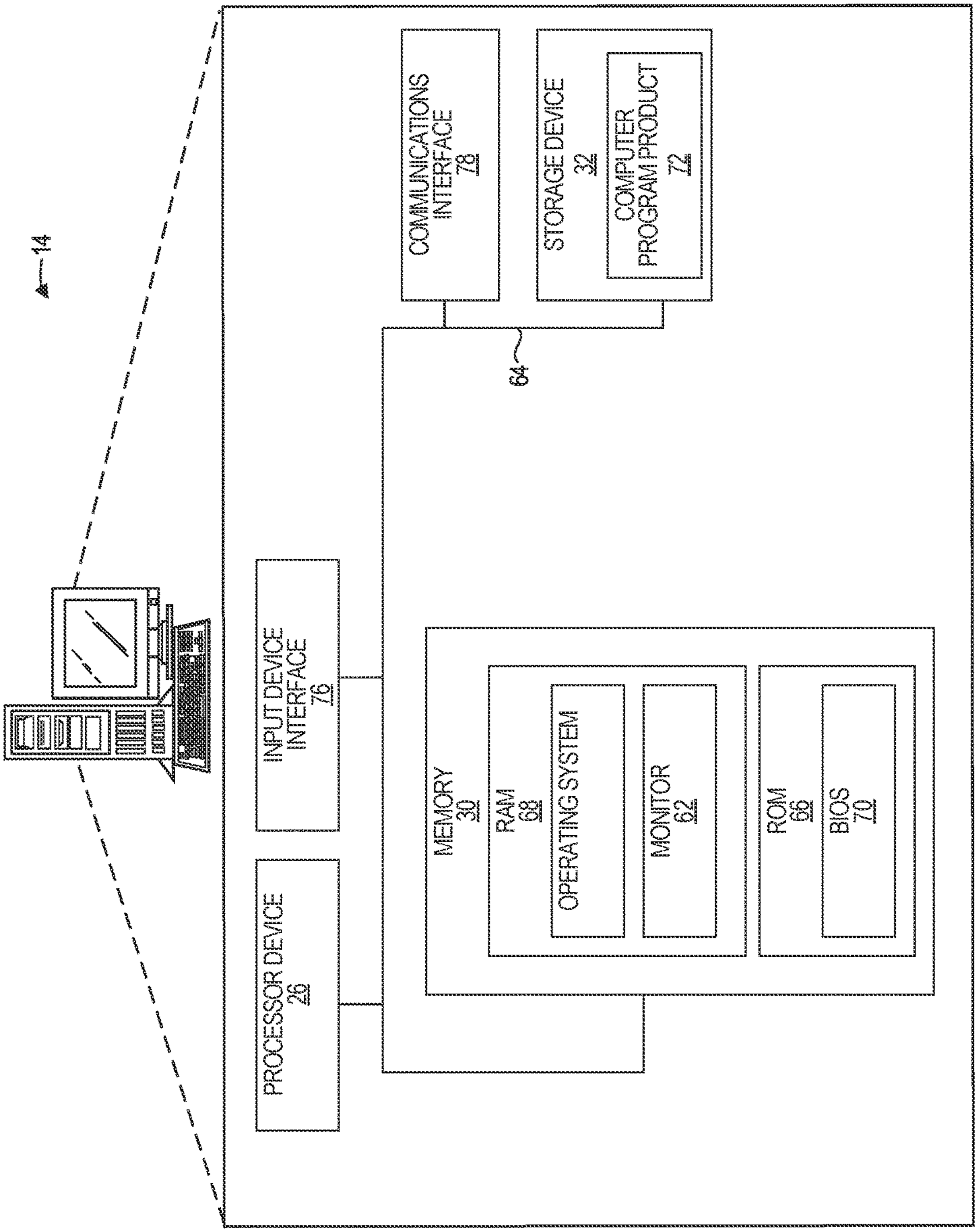
FIG. 4 is a block diagram of a computing device suitable for implementing real-time application prioritization according to some implementations.

FIG. 4 is a block diagram of the computing device 14 suitable for implementing real-time application prioritization according to some implementations. The computing device 14 may comprise any computing or electronic device capable of including firmware, hardware, and/or executing software instructions to implement the functionality described herein, such as a electronic control unit installed in a vehicle, a printed circuit board, a computer server, a desktop computing device, a laptop computing device, a smartphone, a computing tablet, or the like. The computing device 14 includes the processor device 26, the system memory 30, and a system bus 64. The system bus 64 provides an interface for system components including, but not limited to, the system memory 30 and the processor device 26. The processor device 26 can be any commercially available or proprietary processor.

The system bus 64 may be any of several types of bus structures that may further interconnect to a memory bus (with or without a memory controller), a peripheral bus, and/or a local bus using any of a variety of commercially available bus architectures. The system memory 30 may include non-volatile memory 66 (e.g., read-only memory (ROM), erasable programmable read-only memory (EPROM), electrically erasable programmable read-only memory (EEPROM), etc.), and volatile memory 68 (e.g., random-access memory (RAM)). A basic input/output system (BIOS) 70 may be stored in the non-volatile memory 66 and can include the basic routines that help to transfer information between elements within the computing device 14. The volatile memory 68 may also include a high-speed RAM, such as static RAM, for caching data.

The computing device 14 may further include or be coupled to a non-transitory computer-readable storage medium such as the storage device 32, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 32 and other drives associated with computer-readable media and computer-usable media may provide non-volatile storage of data, data structures, computer-executable instructions, and the like.

A number of modules can be stored in the storage device 32 and in the volatile memory 68, including an operating system and one or more program modules, such as the monitor 62, which may implement the functionality described herein in whole or in part. All or a portion of the examples may be implemented as a computer program product 72 stored on a transitory or non-transitory computer-usable or computer-readable storage medium, such as the storage device 32, which includes complex programming instructions, such as complex computer-readable program code, to cause the processor device 26 to carry out the steps described herein. Thus, the computer-readable program code can comprise software instructions for implementing the functionality of the examples described herein when executed on the processor device 26. The processor device 26, in conjunction with the monitor 62 in the volatile memory 68, may serve as a controller, or control system, for the computing device 14 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 26 through an input device interface 76 that is coupled to the system bus 64 but can be connected by other interfaces such as a parallel port, an Institute of Electrical and Electronic Engineers (IEEE) 1394 serial port, a Universal Serial Bus (USB) port, an IR interface, and the like. The computing device 14 may also include a communications interface 78 suitable for communicating with the network 20 as appropriate or desired.

Individuals will recognize improvements and modifications to the preferred examples of the disclosure. All such improvements and modifications are considered within the scope of the concepts disclosed herein and the claims that follow.

What is claimed is:

1. A method, comprising:

accessing, by a monitor executing on a computing device, a current resource utilization value of a computing resource used by a first application executing on the computing device, the current resource utilization value quantifying a utilization of the computing resource, the first application having a priority application designation and being one of a plurality of applications executing on the computing device, at least one of the plurality of applications lacking the priority application designation;

accessing, by the monitor, an application profile that identifies a plurality of resource utilization trigger conditions that correspond to the computing resource, each resource utilization trigger condition identifying a resource utilization value and each resource utilization trigger condition corresponding to a different non-preferred state of a plurality of non-preferred states;

determining, by the monitor, based on the current resource utilization value of the computing resource matching the resource utilization value identified by a first resource utilization trigger condition of the plurality of resource utilization trigger conditions, that the first application is in a first non-preferred state of the plurality of non-preferred states, wherein the first non-preferred state corresponds to the first resource utilization trigger condition; and in response to determining that the first application is in the first non-preferred state, selecting, by the monitor, a first resource utilization action corresponding to the first non-preferred state; and causing, by the monitor, the first resource utilization action in the computing device to cause an additional quantity of the computing resource to be available to the first application.

2. The method of claim 1, wherein accessing the current resource utilization value of the first application comprises iteratively invoking an entry point of a process executing on the computing device that, when invoked, returns the current resource utilization value.

3. The method of claim 2, wherein the current resource utilization value comprises one or more of a current memory utilization, a current processor utilization, a current network utilization, and a current storage utilization.

4. The method of claim 1, wherein accessing the current resource utilization value of the first application further comprises accessing the current resource utilization value of a plurality of applications executing on the computing device including the first application, each application of the plurality of applications having the priority application designation.

5. The method of claim 1, wherein accessing, by the monitor, the application profile further comprises accessing the application profile from a plurality of application profiles, each application profile corresponding to an application having the priority application designation.

6. The method of claim 1, wherein the computing resource comprises a random access memory (RAM) computing resource, and wherein the first resource utilization trigger condition identifies a quantity of RAM, and wherein the current resource utilization value quantifies a current RAM utilization, and further comprising:

determining, by the monitor, an available RAM of the computing device;

identifying, by the monitor, a second application that lacks the priority application designation; and wherein the first resource utilization action comprises causing, by the monitor, the second application to be terminated.

7. The method of claim 6, further comprising:

determining, by the monitor, that the available RAM is less than an amount of RAM identified in the first resource utilization trigger condition; and wherein the second application is caused to be terminated in response to determining that the available RAM is less than the amount of RAM identified in the first resource utilization trigger condition.

8. The method of claim 1, wherein the computing resource comprises a RAM resource, and wherein the first resource utilization trigger condition identifies a quantity of RAM, and wherein the current resource utilization value quantifies a current RAM utilization, and further comprising:

determining, by the monitor, an available RAM of the computing device; identifying, by the monitor, a second application that lacks the priority application designation; and wherein the first resource utilization action comprises causing, by the monitor, a reduction in an amount of memory that is allocated to the second application, the amount of memory being less than a current amount of memory being used by the second application prior to the first resource utilization action.

9. The method of claim 1, wherein the computing resource comprises a processor utilization computing resource, and wherein the first resource utilization trigger condition identifies an amount of available processor utilization value, and wherein the current resource utilization value quantifies a current processor utilization, and further comprising:

identifying, by the monitor, a processor core of a plurality of processor cores of the computing device;

wherein the first resource utilization action comprises causing, by the monitor, the processor core to be exclusively allocated to the first application.

10. The method of claim 1, wherein the computing resource comprises a network bandwidth utilization computing resource, and wherein the first resource utilization trigger condition identifies an amount of available network bandwidth, and wherein the current resource utilization value quantifies a current network bandwidth utilization, and further comprising:

identifying, by the monitor, a second application that lacks the priority application designation; and wherein the first resource utilization action comprises causing, by the monitor, the second application to utilize less network bandwidth.

11. The method of claim 1, wherein the computing resource comprises a storage utilization computing resource, and wherein the first resource utilization trigger condition identifies an amount of storage, and wherein the current resource utilization value quantifies a current available storage, and further comprising:

determining, by the monitor, that the amount of storage currently used by the first application and the current available storage is less than the amount of storage; and wherein the first resource utilization action comprises causing, by the monitor, a storage enlargement action that causes the current available storage to increase.

12. The method of claim 11, wherein the storage enlargement action comprises initiating a storage garbage collection process.

13. The method of claim 11, wherein the storage enlargement action comprises:

identifying, by the monitor, a second application that lacks the priority application designation and is utilizing a quantity of storage; and causing, by the monitor, the second application to be terminated.

14. A computing device, comprising:

a memory; and a processor device coupled to the memory to:

access a current resource utilization value of a computing resource used by an application executing on the computing device, the current resource utilization value quantifying a utilization of the computing resource, the application having a priority application designation and being one of a plurality of applications executing on the computing device, at least one of the plurality of applications lacking the priority application designation;

access an application profile that identifies a plurality of resource utilization trigger conditions that correspond to the computing resource, each resource utilization trigger condition identifying a resource utilization value and each resource utilization trigger condition corresponding to a different non-preferred state of a plurality of non-preferred states;

determine, based on the current resource utilization value of the computing resource matching the resource utilization value identified by a first resource utilization trigger condition of the plurality of resource utilization trigger conditions, that the application is in a first non-preferred state of the plurality of non-preferred states, wherein the first non-preferred state corresponds to the first resource utilization trigger condition;

in response to determining that the application is in the first non-preferred state, select a first resource utilization action corresponding to the first non-preferred state; and cause the first resource utilization action in the computing device to cause an additional quantity of the computing resource to be available to the application.

15. A non-transitory computer-readable storage medium that includes executable instructions to cause a processor device to:

access a current resource utilization value of a computing resource used by an application executing on a computing device, the current resource utilization value quantifying a utilization of the computing resource, the application having a priority application designation and being one of a plurality of applications executing on the computing device, at least one of the plurality of applications lacking the priority application designation;

access an application profile that identifies a plurality of resource utilization trigger conditions that correspond to the computing resource, each resource utilization trigger condition identifying a resource utilization value and each resource utilization trigger condition corresponding to a different non-preferred state of a plurality of non-preferred states;

determine, based on the current resource utilization value of the computing resource matching the resource utilization value identified by a first resource utilization trigger condition of the plurality of resource utilization trigger conditions, that the application is in a first non-preferred state of the plurality of non-preferred states, wherein the first non-preferred state corresponds to the first resource utilization trigger condition;

in response to determining that the application is in the first non-preferred state, select a first resource utilization action corresponding to the first non-preferred state; and cause the first resource utilization action in the computing device to cause an additional quantity of the computing resource to be available to the application.

* * * * *